(12) United States Patent
Ritter et al.

(10) Patent No.: US 9,043,954 B2
(45) Date of Patent: Jun. 2, 2015

(54) EXTENDABLE DRIVE SHAFT FOR AUTO HEADER HOOKUP

(71) Applicant: Deere & Company, Moline, IL (US)

(72) Inventors: Aaron S Ritter, Milan, IL (US); Paul D Marvin, Dewitt, IA (US)

( * ) Notice: Subject to any disclaimer, the term of this patent is extended or adjusted under 35 U.S.C. 154(b) by 192 days.

(21) Appl. No.: 13/780,669

(22) Filed: Feb. 28, 2013

(65) Prior Publication Data
US 2014/0237971 A1 Aug. 28, 2014

(51) Int. Cl.
*A01D 34/00* (2006.01)
*A01D 34/03* (2006.01)
*A01B 71/06* (2006.01)
*A01D 41/14* (2006.01)
*A01D 41/16* (2006.01)

(52) U.S. Cl.
CPC .............. *A01D 34/03* (2013.01); *A01B 71/063* (2013.01); *A01D 41/142* (2013.01); *A01D 41/16* (2013.01)

(58) Field of Classification Search
CPC ..... A01D 41/142; A01D 34/30; A01D 41/14; A01D 57/20; A01D 43/06
USPC .......... 56/15.3, 257, 296, 208, 14.7; 403/344, 403/202; 74/40
See application file for complete search history.

(56) References Cited

U.S. PATENT DOCUMENTS

| | | | | |
|---|---|---|---|---|
| 2,742,753 A | * | 4/1956 | Hardman | 56/296 |
| 2,885,232 A | * | 5/1959 | Eberly | 403/202 |
| 3,270,489 A | * | 9/1966 | Rohweder | 56/15.6 |
| 3,324,637 A | | 6/1967 | Ashton et al. | |
| 3,431,711 A | * | 3/1969 | Reinhold | 56/15.6 |
| 3,535,859 A | * | 10/1970 | Adams | 56/10.4 |
| 4,091,602 A | * | 5/1978 | Williams et al. | 56/14.4 |
| 4,191,006 A | * | 3/1980 | Kerber et al. | 56/11.6 |
| 4,859,110 A | * | 8/1989 | Dommel | 403/325 |
| 6,705,067 B2 | * | 3/2004 | Schroeder et al. | 56/14.6 |
| 6,895,734 B2 | | 5/2005 | Ameye | |
| 7,552,578 B2 | * | 6/2009 | Guske | 56/15.6 |
| 7,810,304 B2 | * | 10/2010 | Priepke | 56/257 |
| 7,836,671 B2 | * | 11/2010 | Sauerwein et al. | 56/296 |
| 8,225,590 B2 | * | 7/2012 | Sauerwein et al. | 56/296 |
| 2008/0006014 A1 | * | 1/2008 | Guske | 56/15.6 |

(Continued)

FOREIGN PATENT DOCUMENTS

DE 2124341 A1 11/1972
EP 1884151 A1 2/2008
(Continued)

OTHER PUBLICATIONS

Eurasian Search Report issued in counterpart application No. 201400142, dated May 20, 2014 (2 pages).
(Continued)

*Primary Examiner* — Árpád Fábián-Kovács (57) ABSTRACT

An agricultural harvester (100) comprises a self-propelled vehicle (102); a feederhouse (104) disposed on the front of the self-propelled vehicle (102); a driveshaft (114), the driveshaft (114) having a proximal end supported for rotation on the feederhouse (104) about an axis of rotation, the driveshaft (114) having a distal end that is extendable from the proximal end; and a first coupler (116) fixed to the distal end, said first coupler (116) being configured for engagement with a second coupler (118), said second coupler (118) being disposed on an agricultural harvesting head (106) to drive a reciprocating knife of the agricultural harvesting head (106).

9 Claims, 6 Drawing Sheets

(56) References Cited

U.S. PATENT DOCUMENTS

2008/0256914 A1* 10/2008 Ricketts et al. ............... 56/10.8
2009/0145097 A1* 6/2009 Priepke ........................ 56/257

FOREIGN PATENT DOCUMENTS

| EP | 1985168 | A1 | 10/2008 |
| SU | 1068065 | A  | 1/1984  |
| SU | 1674733 | A1 | 9/1991  |
| SU | 1782428 | A1 | 12/1992 |

OTHER PUBLICATIONS

European Search Report issued in counterpart application No. 14151951.2, dated Jul. 3, 2014 (4 pages).

* cited by examiner

EXTENDABLE DRIVE SHAFT FOR AUTO HEADER HOOKUP

FIELD

The field is agricultural work vehicles. More particularly the field is shaft couplers for coupling agricultural harvesting heads to harvesting vehicles.

BACKGROUND

Agricultural work vehicles such as agricultural harvesters travel through agricultural fields harvesting crops. These vehicles are typically arranged into 2 major subcomponents that are selectively coupled together.

The first subcomponent is the harvesting vehicle. The harvesting vehicle is configured to gather the cut crop material, thresh the grain, separate the grain from the material other than grain (MOG), clean the grain, and store the grain until it can be unloaded from the vehicle. Harvesting vehicles such as this are typically called "combine harvesters" or "combines".

The second subcomponent is the agricultural harvesting head. The agricultural harvesting head is configured to engage a particular crop or crops as it travels through the field supported on the front of the harvesting vehicle, to separate the crop from the ground, and to convey the crop to the harvesting vehicle. Agricultural harvesting heads are specially configured based upon the crop or crops they are designed to harvest, which typically include such crops as wheat, soybeans, corn, rice, and rapeseed.

Agricultural harvesting heads are typically mounted on a support structure called a "feederhouse" that extends forward from the front of the harvesting vehicle. They include components such as conveyor belts, augers, and reciprocating knives that are driven by an internal combustion engine mounted on the harvesting vehicle.

To connect the two together, the vehicle operator maneuvers the vehicle until the feederhouse and the agricultural harvesting head are aligned. The operator then climbs down from the harvesting vehicle, approaches the front of the harvesting vehicle, and manually couples the harvesting vehicle and the agricultural harvesting head together.

Once the two are connected, the operator then returns to the latter, climbs up to the operator station, and starts the vehicle. This is a time-consuming process.

What is needed, therefore, is a more efficient means of coupling the agricultural work vehicle to an agricultural harvesting head.

It is an object of this invention to provide such a system.

SUMMARY

In one arrangement, an agricultural harvester comprises: a self-propelled vehicle; a feederhouse disposed on the front of the self-propelled vehicle; a driveshaft, the driveshaft having a proximal end supported for rotation on the feederhouse about an axis of rotation, the driveshaft having a distal end that is extendable from the proximal end; and a first coupler fixed to the distal end, said first coupler being configured for engagement with a second coupler, said second coupler being disposed on an agricultural harvesting head to drive a reciprocating knife of the agricultural harvesting head.

The agricultural harvester may further comprise a piston fixed to the driveshaft to extend the distal end with respect to the proximal end.

The driveshaft may comprise a first sliding shaft, and a second sliding shaft slidingly supported on the first sliding shaft.

The first splines may be disposed on the first sliding shaft, and second splines are disposed on the second sliding shaft, and the first sliding shaft may be received into the second sliding shaft such that the first splines slidingly engage the second splines.

A piston rod supporting a piston may be fixed to the second sliding shaft, and the piston rod and the piston may be slidingly received in a longitudinal bore formed in the first sliding shaft.

A longitudinal bore may be formed in the driveshaft and a hydraulic passageway may extend between an outer surface of the driveshaft to conduct hydraulic fluid from an outer surface of the driveshaft into the longitudinal bore.

The piston may be disposed in the longitudinal bore to contact and be actuated by hydraulic fluid passing through the hydraulic passageway and into the longitudinal bore.

The piston may be fixed to a piston rod disposed within the longitudinal bore, and the piston rod may be fixed to the distal end of the driveshaft.

A first hydraulic fluid connector may be supported on the outer surface of the driveshaft for free rotation about the driveshaft.

The first hydraulic fluid connector and the outer surface of the driveshaft may define an annular gap.

The first hydraulic fluid connector may have a plurality of shaft seals that extend about and seal against the driveshaft to ensure that hydraulic fluid forced into the first hydraulic fluid connector is communicated into the annular gap and thence through the hydraulic passageway.

DETAILED DESCRIPTION

Figure 1:
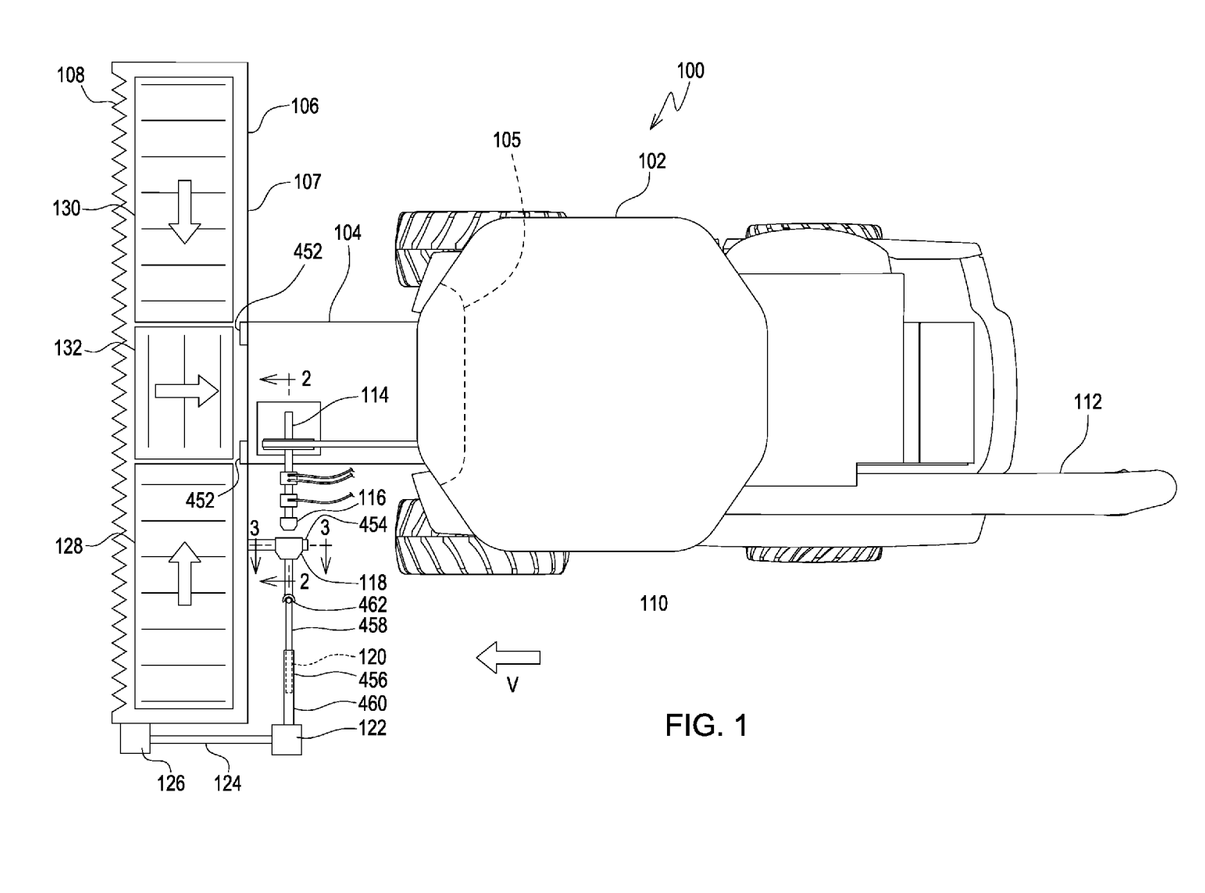
FIG. 1 is a plan view of an agricultural harvester and agricultural harvesting head incorporating the present invention.

In the disclosure herein, the terms "front", "forward", "in front of" and the like refer to a forward direction of travel "V" indicated in FIG. 1. The forward direction of travel is a direction traveled by the agricultural harvester 100 when it is moving in a straight line harvesting crops. The terms "rear", "backward", "behind", "to the rear of", and the like refer to the direction opposite to the forward direction of travel "V". The term "lateral", "width", or "side-to-side", refer to a direction perpendicular to the forward direction of travel "V".

In FIG. 1, an agricultural harvester 100 comprises a self-propelled vehicle 102 from which a feederhouse 104 extends from the forward end of the self-propelled vehicle 102. The agricultural harvester 100 supports an agricultural harvesting head 106, which is supported on the forward free end of feederhouse 104. An enclosed operator station 105 is disposed on the self-propelled vehicle 102 above the feederhouse 104. The agricultural harvesting head 106 further comprises a frame 107 that is elongate and extends substantially the entire width of the agricultural harvesting head 106.

In normal operation, the agricultural harvester 100 is driven through the field in a forward direction of travel "V". As the agricultural harvester 100 travels, it carries the agricultural harvesting head 106 with it.

A reciprocating knife 108 disposed at the front of the agricultural harvesting head 106 and is supported on the frame 107. The reciprocating knife 108 extends substantially the entire lateral width of the agricultural harvesting head 106. The reciprocating knife 108 severs crop plants near their roots, and they fall upon the laterally extending conveyors (not shown) of the agricultural harvesting head 106. They are then conveyed toward the center of the agricultural harvesting head 106 by conveyors, and are then sent rearward through a conveyor (not shown) that is disposed inside the feederhouse 104 and into the self-propelled vehicle 102 itself. Once in the self-propelled vehicle 102, the severed crop plants are further processed by separating grain from material other than grain (MOG) and saving the grain in a grain tank 110. Periodically, a vehicle travels alongside the self-propelled vehicle 102 and receives grain from the grain tank 110 which is carried outward away from the vehicle through a conveyor 112. In FIG. 1, the conveyor 112 is shown in its storage position. During unloading operations, however, the conveyor 112 is pivoted to extend laterally away from the side of the self-propelled vehicle 102.

The various moving devices in the agricultural harvesting head 106 are driven by the engine in the self-propelled vehicle 102. The engine in the self-propelled vehicle 102 transmits power to a driveshaft 114 that is disposed at and supported on the front of the feederhouse 104, causing the driveshaft 114 rotate.

A first coupler 116 is fixed to one end of the driveshaft 114. The first coupler 116 is configured to mate with and drivingly engage a second coupler 118. The second coupler 118 is fixed to a second driveshaft 120.

When the first coupler 116 and the second coupler 118 are drivingly engaged, the engine transmits power to the driveshaft 114, through the first coupler 116, into the second coupler 118, and then into the second driveshaft 120.

Second driveshaft 120 extends across the rear of the agricultural harvesting head 106 to the left end of the agricultural harvesting head 106 where it enters a first gearbox 122. A third driveshaft 124 is coupled to the second driveshaft 120 and is driven thereby. Third driveshaft 124 extends forward adjacent to the left end of the agricultural harvesting head 106 and is coupled at its forward end to a second gearbox 126. Second gearbox 126, in turn, is coupled to and drives the reciprocating knife 108, the left side conveyor 128, the right side conveyor 130, the center conveyor 132, and other.

Figures 2A, 2B:
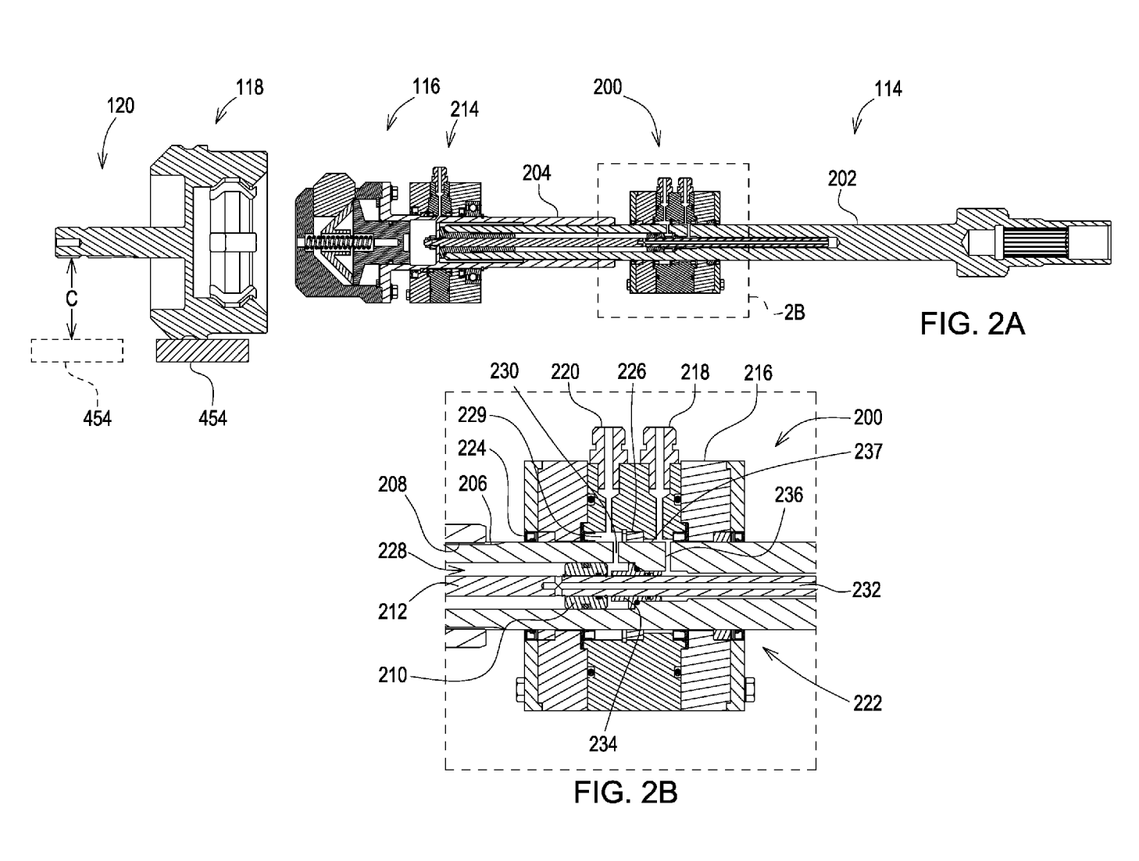
FIG. 2A is a cross-sectional view of an extendable driveshaft and coupler that connect the agricultural harvester and agricultural harvesting head of FIG. 1 taken at section line 2-2 in FIG. 1.
FIG. 2B is a detail cross-sectional view of the extendable driveshaft arrangement in the foregoing figures.

In FIG. 2, driveshaft 114, first coupler 116, and second coupler 118 are shown in the same spaced apart arrangement as they are shown in FIG. 1. Driveshaft 114 can be extended and retracted by the selective injection and removal of hydraulic fluid from first hydraulic fluid connector 200. Driveshaft 114 has a first sliding shaft 202 and a second sliding shaft 204 that are engaged each other to permit sliding relative movement of the first sliding shaft 202 with respect to the second sliding shaft 204. The first sliding shaft 202 and the second sliding shaft 204 have a mating surface features that permit them to slide with respect to each other in a direction parallel to the longitudinal axes, yet permit them to communicate torque, and thus power one to the other. The mating surface features include splines 206 on the outer surface of first sliding shaft 202, and splines 208 disposed on an inner surface of second sliding shaft 204. Splines 206 and splines 208 are the structures that mutually interengage with each other to permit first sliding shaft 202 to slide with respect to second sliding shaft 204 while simultaneously permitting torque to be communicated from first sliding shaft 202 to second sliding shaft 204.

First sliding shaft 202 is disposed within second sliding shaft 204. First sliding shaft 202 has a hollow bore that receives a piston 210 that is supported on a piston rod 212. Piston rod 212 is fixed to the outer end 214 of second sliding shaft 204.

The first hydraulic fluid connector 200 is supported for rotation on the outer surface of first sliding shaft 202. First hydraulic fluid connector 200 comprises a connector body 216 that is generally cylindrical, a first hydraulic connector 218, a second hydraulic connector 220, a first shaft seal 222, a second shaft seal 224, and a third shaft seal 226 that is disposed between the first hydraulic connector 218 and the second hydraulic connector 220 in an axial direction. The first shaft seal 222 and the second shaft seal 224 are disposed at each end of the first hydraulic fluid connector 200 to prevent hydraulic fluid injected into the first hydraulic fluid connector 200 from leaking out between the first hydraulic fluid connector 200 and the outer surface of first sliding shaft 202. The third shaft seal 226 is disposed between the first hydraulic connector 218 and the second hydraulic connector 220 to prevent hydraulic fluid from passing directly from the first hydraulic connector 218 to the second hydraulic connector 220 (and vice versa) without first passing through the longitudinal bore 228 of the first sliding shaft 202 and effecting movement of the piston 210 and piston rod 212 disposed inside the longitudinal bore 228.

In operation, the first hydraulic fluid connector 200 can turn freely around the outer surface of the first sliding shaft 202 upon the first shaft seal 222, the second shaft seal 224, and the third hydraulic seal. The first sliding shaft 202 can rotate about its longitudinal axis, and communicate power from the driveshaft 114 to the second driveshaft 120 and the first hydraulic fluid connector 200 can be held stationary. This is particularly beneficial because it permits the first hydraulic fluid connector 200 to be connected to stationary hydraulic lines, and held in place to extend and retract the driveshaft 114 as the driveshaft 114 is rotating.

First hydraulic connector 218 and second hydraulic connector 220 are connected to hydraulic lines to communicate hydraulic fluid to and from the first hydraulic fluid connector 200. The hydraulic lines, hydraulic valves, electronic controls that are used to direct hydraulic fluid into and out of the first hydraulic fluid connector 200 form no part of this invention. They are of conventional arrangement and are well known in the art.

When hydraulic fluid is injected into the second hydraulic connector 220, the hydraulic fluid passes into an annular gap 229 that is disposed between an inner surface of the connector body 216 and an outer surface of the first sliding shaft 202. The first hydraulic passageway 230 is disposed to conduct hydraulic fluid from the annular gap 229, through the outer surface of the first sliding shaft 202 and thence to the right side (in FIGS. 2A, 2B) of the piston 210. This hydraulic fluid causes the piston 210 to move to the left (in FIGS. 2A, 2B) in the longitudinal bore 228. As the piston 210 moves to the left, hydraulic fluid in the longitudinal bore 228 on the left side of the piston 210 is forced into a second hydraulic passageway 232 in the piston rod 212. Hydraulic fluid entering the second hydraulic passageway 232 travels to the right end (in FIGS. 2A, 2B) of the piston rod 212 where it is released and returns back to the first hydraulic fluid connector 200 traveling around the outer annular surface of the piston rod 212. Upon arriving back at the first hydraulic fluid connector 200, the hydraulic fluid meets a fourth shaft seal 234, which seals the outer surface of piston rod 212 against the inner surface of longitudinal bore 228. Fourth shaft seal 234 prevents the returning hydraulic fluid from acting upon the right face of the piston rod 212 and forces it to exit the first sliding shaft 202 through third hydraulic passageway 236. Fluid exiting the first sliding shaft 202 enters an annular gap 237 that extends about the periphery of the first sliding shaft 202. Fluid entering the annular gap 237 enters the first hydraulic connector 218 and is carried away from the first hydraulic fluid connector 200. The annular gap 229 and the annular gap 237 permit hydraulic fluid to be communicated to and from the first hydraulic fluid connector 200 to the first sliding shaft 202 regardless of the rotational position of the first hydraulic fluid connector 200 with respect to the first sliding shaft 202.

Thus, hydraulic fluid injected into second hydraulic connector 220 causes driveshaft 114 to extend. Similarly, injecting fluid into first hydraulic connector 218 causes driveshaft 114 to retract.

Figure 4A:
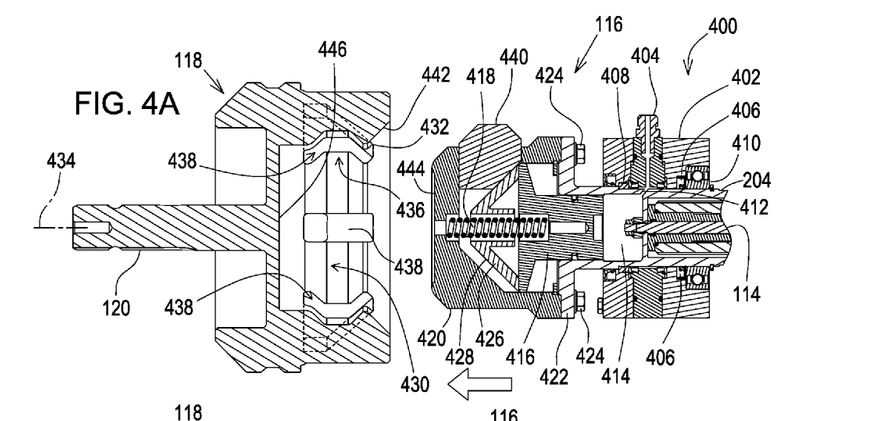
FIGS. 4A-4F are cross-sectional views of the extendable driveshaft and coupler of the foregoing figures at various stages of the engagement and disengagement process.

Referring now to FIG. 4A, a second hydraulic fluid connector 400 is provided on driveshaft 114 to communicate hydraulic fluid to and from the first coupler 116, causing the first coupler 116 to drivingly engage the second coupler 118. The second hydraulic fluid connector 400 comprises a second connector body 402 that is generally cylindrical, a third hydraulic connector 404, a fifth shaft seal 406, a sixth shaft seal 408 and a bearing 410.

The second hydraulic fluid connector 400 is supported on the bearing 410 on second sliding shaft 204. This support permits it to rotate with respect to the outer surface of the second sliding shaft 204. As with the first hydraulic fluid connector 200, this permits the second hydraulic fluid connector 400 to be held stationary as the driveshaft 114 (and hence the second sliding shaft 204) rotate about its longitudinal axis. As with the first hydraulic fluid connector 200, this permits hydraulic lines to be connected to the third hydraulic connector 404, and fluid to be introduced into or extracted from the third hydraulic connector 404 while the driveshaft 114 is rotating.

Fifth shaft seal 406 is located on the right side (in FIGS. 4A-4F) and extends between the inner surface of the second hydraulic fluid connector 400 and the outer surface of second sliding shaft 204. Fifth shaft seal 406 prevents hydraulic fluid from leaking out of the second hydraulic fluid connector 400 along the outer surface of second sliding shaft 204.

Sixth shaft seal 408 is located on the left side (in FIGS. 4A-4F) and extends between the inner surface of the second hydraulic fluid connector 400 and the outer surface of the second sliding shaft 204. Sixth shaft seal 408 prevents hydraulic fluid from leaking out of the second hydraulic fluid connector 400 along the outer surface of second sliding shaft 204.

Second sliding shaft 204 has a fourth hydraulic passageway 412 that conducts hydraulic fluid from an outer surface of second sliding shaft 204 to an inner chamber 414. Inner chamber 414 supports a piston 416 for axial movement with respect to a longitudinal axis of driveshaft 114. Piston 416 seals against the inner surface of inner chamber 414, and is actuated by hydraulic fluid that is injected into or extracted from third hydraulic connector 404. Hydraulic fluid is conducted from the third hydraulic connector 404 into an annular gap 417 extends about the outer surface of second sliding shaft 204. Hydraulic fluid in the annular gap 417 is conducted into the fourth hydraulic passageway 412, and thence into the inner chamber 414.

By providing the annular gap 417, hydraulic fluid may be conducted from the third hydraulic connector 404 to the piston 416 to actuate the piston regardless of the rotational position of the second hydraulic fluid connector 400 with respect to the second sliding shaft 204.

In operation, hydraulic fluid from outside sources is injected into the third hydraulic connector 404. This hydraulic fluid travels through the fourth hydraulic passageway 412 and into the inner chamber 414. Once in the inner chamber 414, the hydraulic fluid acts against the face of the piston 416. This causes the piston 416 to move axially with respect to the driveshaft 114 (i.e. the second sliding shaft 204). I this movement of the piston 416 causes a coil spring 418 to push against the piston 416 and be compressed.

When hydraulic fluid is released from the third hydraulic connector 404, the coil spring 418 releases its stored internal energy, and pushes the piston 416 to the right (in FIGS. 4A-4F) with respect to the driveshaft 114 (the second sliding shaft 204). This causes the hydraulic fluid in the inner chamber 414 to be ejected from the third hydraulic connector 404.

The piston 416 is a portion of the first coupler 116, which is fixed to the outer end of the driveshaft 114 (the second sliding shaft 204).

The first coupler 116 comprises a coupler body 420 that is fixed to a flange 422 with threaded fasteners 424. Flange 422 extends outward from the leftmost end of the second sliding shaft 204 and provides a mounting point for the coupler body 420.

The coupler body 420 encloses the piston 416, as well as a conical member 426 that abuts the piston 416 and is actuated by the piston 416 when the piston 416 moves axially.

Figure 3:
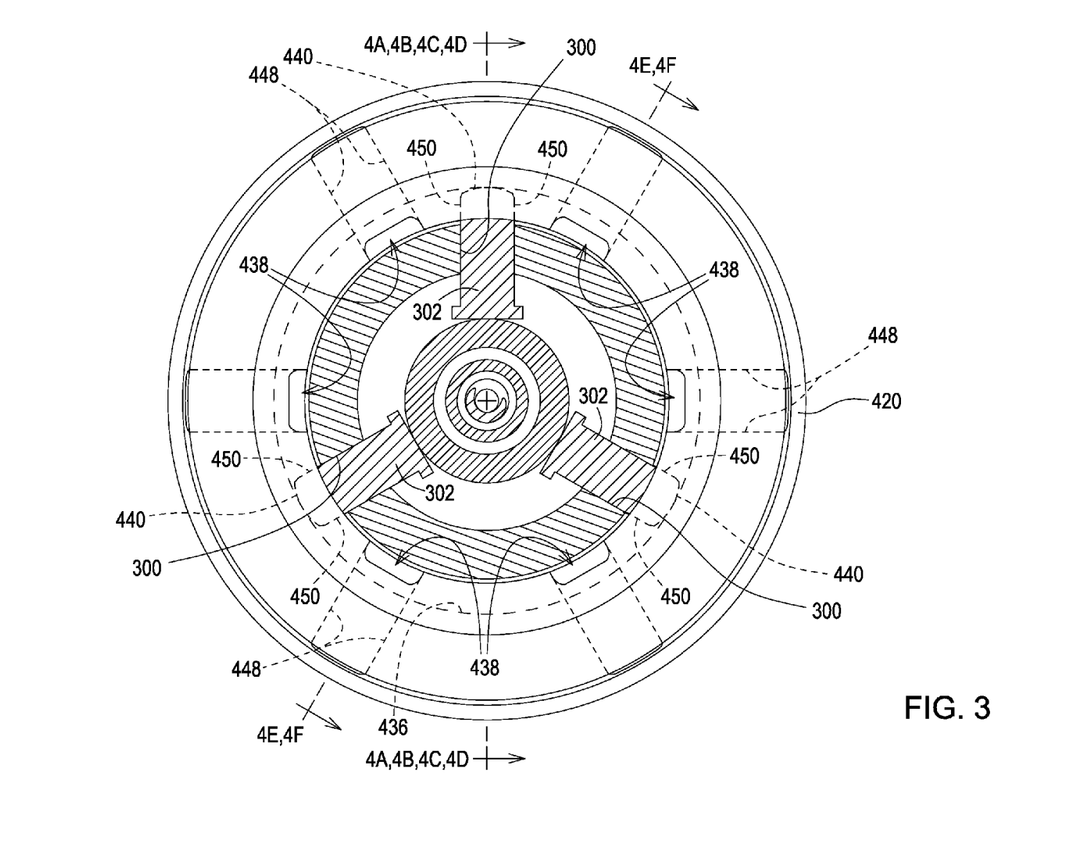
FIG. 3 is a cross-sectional view of the coupler of the foregoing figures taken at section line 3-3 in FIG. 1.

Referring to FIG. 3, the coupler body 420 has three slots 300 that are equiangularly disposed with respect to each other in a plane perpendicular to the longitudinal axis of first coupler 116 and the longitudinal axis of driveshaft 114. Each of the three circumferential slots 300 receives and supports a corresponding one of keys 302. Each of the three circumferential slots 300 supports its corresponding key 302 for radial movement toward and away from a longitudinal rotational axis 434 of second coupler 118, which is coaxial with the driveshaft 114, the first sliding shaft 202, and the second sliding shaft 204.

Referring back to FIGS. 4A-4F, as hydraulic fluid from an outside source is injected into the third hydraulic connector 404, it causes the piston 416 to translate to the left (in FIGS. 4A-4F). This movement causes the conical member 426 to also translate to the left with respect to the coupler body 420. The conical member 426 has an outer conical surface 428 that abuts an inner surface of each of the three keys 302. The three keys 302 are constrained by the sidewalls of their respective three circumferential slots 300 such that the movement of the conical member 426 to the left causes the three keys 302 to move radially outward with respect to the coupler body 420.

Thus, by introducing hydraulic fluid into the third hydraulic connector 404, the three keys 302 of the first coupler 116 extend outward from the coupler body 420. Similarly, by permitting hydraulic fluid to escape from the third hydraulic connector 404, the three keys 302 of the first coupler 116 retract inward into the coupler body 420.

The second coupler 118 has a coupler body 429 that is generally cylindrical and defines a cavity 430. The cavity 430 is generally cylindrical, and has a longitudinal axis that is parallel to the longitudinal rotational axis 434. The opening of the cavity 430 is defined by an opening in an end of the second coupler 118 that is opposite the second driveshaft 120. The opening of the cavity 430 faces the first coupler 116.

The internal walls of the second coupler 118 that define the cavity 430 are configured to receive and support the outer end of the first coupler 116, which includes the three keys 302.

The internal walls of the second coupler 118 that define the cavity 430 define a shoulder 432 in the form of an annulus that extends inwardly toward the longitudinal rotational axis 434 of the second coupler 118.

The shoulder 432 extends around substantially the entire inner circumference of the cavity 430, such that it defines a trough 436 in the form of an annulus. Trough 436 is disposed in the cylindrical side wall of cavity 430. Trough 436 is coaxial with the longitudinal rotational axis 434 and coaxial with the second driveshaft 120.

Six recesses 438 are formed in the internal walls of the second coupler 118 that define the cavity 430. The six recesses 438 are disposed at the bottom of the trough 436. The six recesses 438 have a longitudinal extent that is generally parallel to the longitudinal rotational axis 434. The longitudinal extent of the recesses 438 is greater than the width of the recesses 438.

The recesses 438 are equiangularly spaced about the longitudinal rotational axis 434 as measured in a plane that is normal to the longitudinal rotational axis 434. Each of the recesses 438 is disposed to engage an outer end portion 440 of a corresponding key 302.

Torque about the longitudinal rotational axis 434 is communicated from the first coupler 116 to the second coupler 118 through the keys 302 that extend into the recesses 438.

FIG. 4A shows the two couplers in a starting position in which the first coupler 116 and the second coupler 118 are not engaged with the each other. In a first step of a coupling process, hydraulic fluid is introduced into the second hydraulic connector 220 of the first hydraulic fluid connector 200 and is communicated into the longitudinal bore 228.

As hydraulic fluid fills the longitudinal bore 228, the hydraulic fluid pushes the piston 210 to the left (in FIG. 2A) causing driveshaft 114 to extend in length.

Figure 4B:
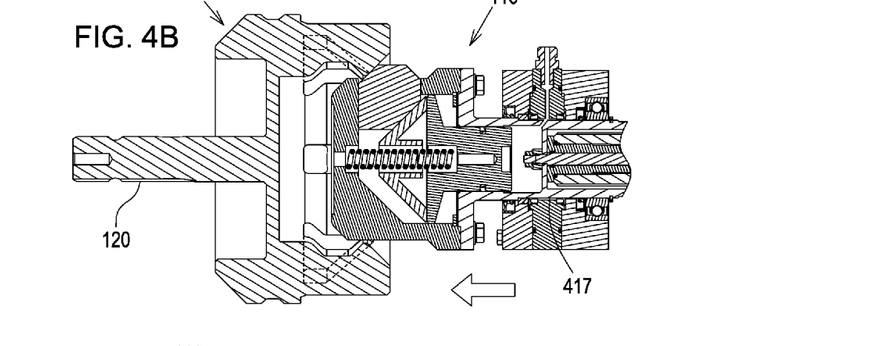

Eventually, each of the three keys 302 will contact an outer edge of the shoulder 432. This relationship is illustrated in FIG. 4 B. As hydraulic fluid continues to fill the longitudinal bore 228, and driveshaft 114 continues to extend, the outer wall 442 of the trough 436 will push against the three keys 302, causing them to slide inwardly in their respective circumferential slots 300, and translate radially inward toward the longitudinal rotational axis of the first coupler 116.

Figure 4C:
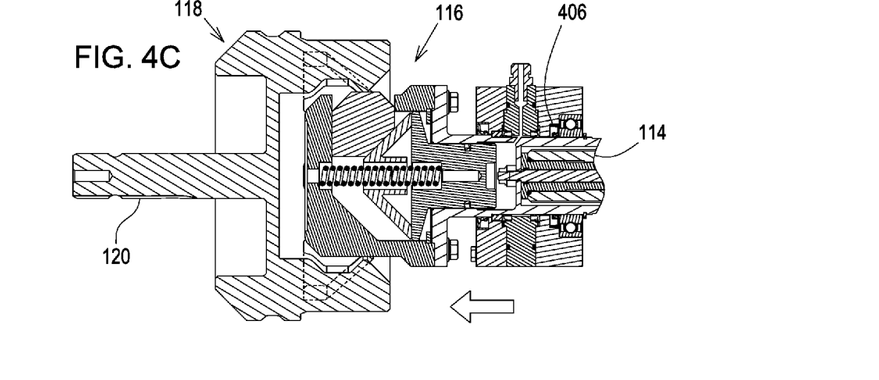

Continued filling of hydraulic fluid into the longitudinal bore 228 will eventually cause the three keys 302 to overtop the shoulder 432 and slide further into the second coupler 118 without further radial translation. This is shown in FIG. 4C.

Eventually, continued hydraulic fluid filling of the longitudinal bore 228 will cause the three keys 302 to pass the shoulder 432 and be received into the trough 436. An end surface 444 of the first coupler 116 will engage an inner surface 446 of the cavity 430, preventing further movement of the first coupler 116 into the second coupler 118.

The three keys 302 at this point are in the retracted positions and oriented radially inwardly of the trough 436.

Figure 4D:
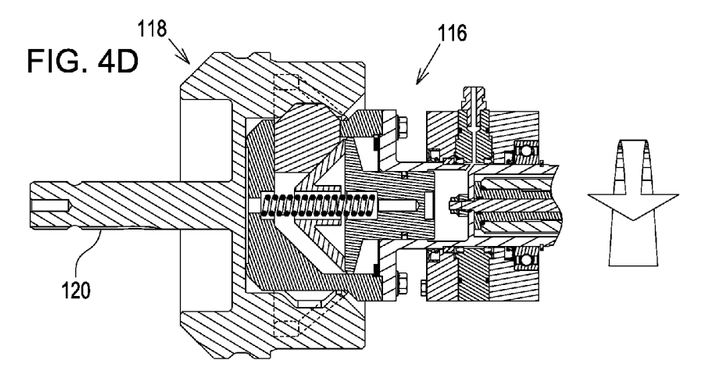

Hydraulic fluid is then applied to the third hydraulic connector 404. Hydraulic fluid flowing into the first coupler 116 causes the three keys 302 to extend outwardly and away from the rotational axis of the first coupler 116 until the three keys 302 abut the bottom of the trough. This position is shown in FIG. 4D.

The three keys 302 extend further, however, when they are aligned with three of the six recesses 438 that are formed in the bottom of the trough 436. To be received into a corresponding three of the six recesses 438, the first coupler 116 must be rotationally aligned with respect to the second coupler 118, such that the three keys 302 are directly above three corresponding recesses of the six recesses 438.

In order to do this, the operator engages the engine to driveshaft 114 and begins to gently rotate driveshaft 114. The first coupler 116 is fixed to the end of driveshaft 114, and therefore rotates with the driveshaft 114.

Figure 4E:
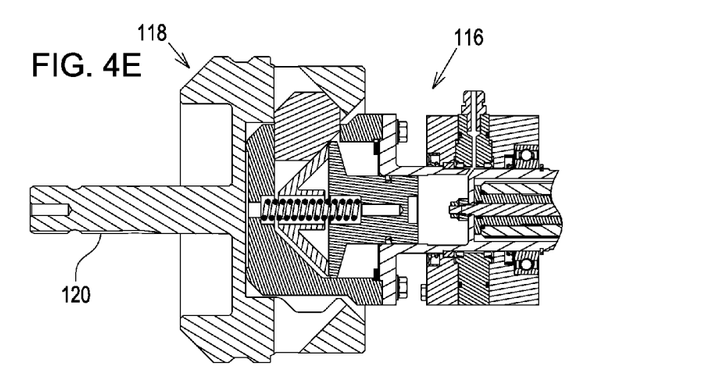

Eventually, the first coupler 116 rotates within the second coupler 118 until the three keys 302 are aligned with three corresponding recesses of the six recesses 438. When this happens, the hydraulic pressure provided by fluid introduced into the third hydraulic connector 404 causes the outer end portions 440 of the three keys 302 to extend further from the rotational axis of the first coupler 116 and drop into three corresponding recesses of the six recesses 438.

When the three keys 302 drop into three corresponding recesses of the six recesses 438, the circumferentially facing sidewalls 448 of the three corresponding recesses of the six recesses 438 abut the circumferentially facing sidewalls 450 of the three keys 302. These abutting sidewalls communicate torque. From that moment, the first coupler 116 and the second coupler 118 are locked together as a single unit.

Figure 4F:
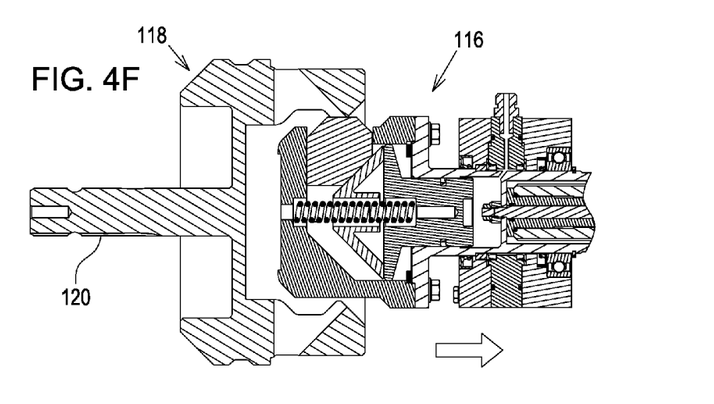

As long as hydraulic fluid is not released from the third hydraulic connector 404, the three keys 302 stay extended. The first coupler 116 cannot be pulled out of the second coupler 118 because the surfaces of the three keys 302 will abut the shoulder 432. Similarly, any rotation of the first coupler 116 will be communicated to the second coupler 118 because of the abutting relationship of the three keys 302 against the side walls of the three corresponding recesses of the six recesses 438.

In order to ensure that the first coupler 116 and the second coupler 118 are properly oriented when this engagement process occurs, both the first coupler 116 and the second coupler 118 should be held in a predetermined alignment one with respect to the other when the operator, who is driving the self-propelled vehicle 102 from the operator station 105, drives a self-propelled vehicle 102 forward and inserts the feederhouse 104 into an aperture on the back of the agricultural harvesting head 106, then raises the feederhouse 104 until agricultural harvesting head 106 is raised and substantially or totally supported on a head support 452.

Head support 452 is typically in the form of one or more hooks that extend forward and upward from the front of the feederhouse 104. These hooks are received in an aperture or apertures in the back of the agricultural harvesting head 106.

When the operator lifts the feederhouse 104 into the air using feederhouse lift cylinders (not shown) the agricultural harvesting head 106 is supported in its proper position on the feederhouse 104. In this position, the first coupler 116 and the second coupler 118 are substantially coaxial, such that when the driveshaft 114 is extended, the first coupler 116 will be properly received into the second coupler 118.

To ensure that the second coupler 118 is in the appropriate position when the operator has raised the feederhouse 104 into the air and lifted the agricultural harvesting head 106 into its proper orientation with respect to the feederhouse 104, a coupler support 454 is provided that extends from the agricultural harvesting head 106. The coupler support 454 is positioned on the agricultural harvesting head 106 such that it supports the second coupler 118 in its proper alignment with respect to the first coupler 116.

The coupler support 454 can comprise brackets, straps, bolts, cradles, detents, or other devices having surfaces to hold the second coupler 118 in proper alignment. In one arrangement, the coupler support 454 includes several spring-loaded ball detents that engage corresponding recesses in the second coupler 118. In another arrangement, the coupler support 454 is a cradle extending underneath the second coupler 118 to hold it in proper alignment.

The first coupler 116 and the second coupler 118 may be provided with a range of movement to accommodate pivoting in flexing of the agricultural harvesting head 106 on the feederhouse 104. In one common arrangement, an agricultural harvesting head 106 can be tilted side to side with respect to the feederhouse 104 and the self-propelled vehicle 102 in order to better follow ground terrain and harvest crops.

This arrangement, however, means that the driveshaft 114 and the second driveshaft 120 must be free to move up and down with respect to the agricultural harvesting head 106 as the agricultural harvester 100 travels through the field harvesting crop.

To provide this freedom of movement during normal operation, the operator performs an additional step as part of the coupler engagement process described above. Once the operator has engaged the two couplers together to communicate torque and prevent them from being pulled apart, he couples a source of hydraulic fluid under pressure to the first hydraulic connector 218. As described above, this causes the driveshaft 114 to retract and its overall length to be reduced. As the length of the driveshaft 114 is reduced, the driveshaft 114 pulls the first coupler 116 and the second coupler 118 (which are bound together at this point) to the right (in FIG. 2A), and pulls the second coupler 118 out of its coupler support 454. The coupler support 454 will be moved relatively with respect to the second coupler 118 to the position shown in dashed lines in FIG. 2A the second coupler 118 is no longer contacting the coupler support 454, and a clearance "C" (in FIG. 2A) is generated between the bottom of second driveshaft 120 and the coupler support 454.

The second coupler 118 can translate without being disengaged from the second driveshaft 120 because the second driveshaft 120 has a splined section 456 defined by an inner tube 458 and an outer that is received inside an outer tube 460. The splined section 456 is dimensioned such that when the second coupler 118 is withdrawn from the coupler support 454 and clearance "C" is provided, there is still sufficient engagement between the inner tube 458 and the outer tube 460 of the second driveshaft 120 that power can be communicated from the driveshaft 114 to the first gearbox 122, and thence to the reciprocating knife 108 and the other driven elements on the agricultural harvesting head 106.

A flexible joint 462 is provided along the length of the second driveshaft 120. This flexible joint 462 permits the agricultural harvesting head 106 to pivot with respect to the feederhouse 104. The flexible joint 462 comprises, for example, a universal joint or constant velocity joint.

Figure 5:
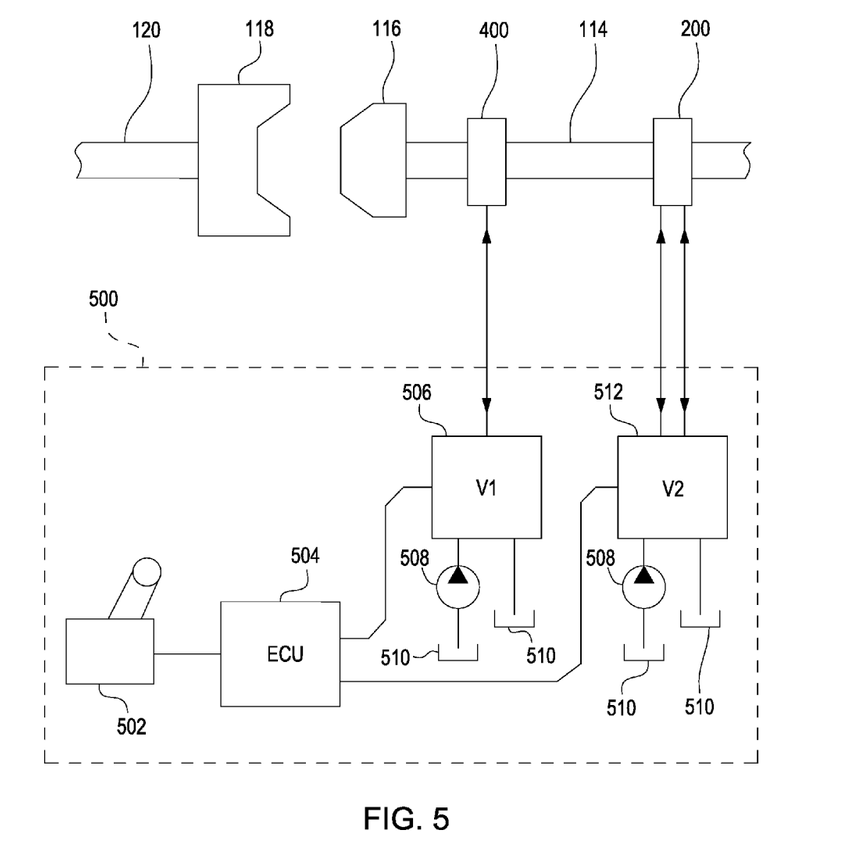
FIG. 5 is a control system configured to operate the arrangement of FIGS. 1-4F.

Referring to FIG. 5, a control system 500 for controlling the arrangement of FIGS. 1-4F is illustrated. Control system 500 comprises an operator input device 502, an electronic control unit (ECU) 504, a first valve 506, a hydraulic fluid source 508, a hydraulic fluid reservoir 510, and a second valve 512.

The operator input device 502 may be a stick, lever, button, dial, knob, shaft encoder, keyboard, touch screen, voice-recognition system, or other electronic operator input device capable of indicating to ECU 504 that the operator desires an engagement or disengagement of driveshaft 114 to second driveshaft 120. In one arrangement, the operator input device 502 is located in the cab of the agricultural harvester 100 (see FIG. 1). In an alternative arrangement, the operator input device 502 is located on or adjacent to the feederhouse 104 where the operator can engage and disengage the driveshaft 114 to the second driveshaft 120 while observing the engagement process and the disengagement process.

The ECU 504 is connected to the operator input device 502 to receive a signal indicating the operator's desire to engage or disengage driveshaft 114 to second driveshaft 120.

The first valve 506 is coupled to the hydraulic fluid source 508 to receive fluid therefrom, and to control the flow of hydraulic fluid to and from the second hydraulic fluid connector 400. The first valve 506 is coupled to the hydraulic fluid reservoir 510 to return hydraulic fluid from the second hydraulic fluid connector 400 to the hydraulic fluid reservoir 510. The ECU 504 is coupled to the first valve 506 to actuate the first valve 506. The first valve 506 is connected to the third hydraulic connector 404.

The second valve 512 is coupled to the hydraulic fluid source 508 to receive fluid therefrom, and to control the flow of hydraulic fluid to and from the first hydraulic fluid connector 200. The second valve 512 is coupled to the hydraulic fluid reservoir 510 to return hydraulic fluid from the first hydraulic fluid connector 200 to the hydraulic fluid reservoir 510. The ECU 504 is coupled to the second valve 512 to actuate the second valve 512. The two hydraulic fluid conduits extending from the second valve 512 are connected to the first hydraulic connector 218 and the second hydraulic connector 220.

In a first mode of operation, when the driveshaft 114 and the second driveshaft 120 are disengaged, the ECU 504 is programmed to monitor the state of the operator input device 502, and when the operator input device 502 is actuated, to actuate the second valve 512 to extend the driveshaft 114 so that the first coupler 116 engages the second coupler 118.

The ECU 504 is programmed to then actuate the first valve 506 to extend the keys 302 until they engage the second coupler 118.

The ECU 504 is programmed to then rotate the driveshaft 114 for a portion of a turn until the keys 302 until the three keys 302 are aligned with three corresponding recesses 438 of the six recesses 438. The hydraulic pressure acting against the piston 416 (the hydraulic pressure being provided by first valve 506) will cause the keys 302 to extend into the three corresponding recesses 438.

The ECU is programmed to then actuate the second valve 512 and retract the driveshaft 114. This causes the first coupler 116 and the now-engaged second coupler 118 to move rightward (in FIGS. 4A-4F and FIG. 5) until the second coupler is pulled away from coupler support 454. At this point, the driveshaft 114 and the second driveshaft 120 are coupled together and the operator can use his operational controls (not shown) in the traditional manner to drive the agricultural harvesting head 106 and harvest the field.

In a second mode of operation, when the driveshaft 114 and the second driveshaft 120 are engaged, the ECU 504 is programmed to monitor the state of the operator input device 502, and when the operator input device 502 is actuated, to actuate the second valve 512 to extend the driveshaft 114 until the second coupler 118 is again supported by the coupler support 454.

The ECU 504 is then programmed to actuate the first valve 506 to permit hydraulic fluid to flow from the second hydraulic fluid connector 400 to the hydraulic fluid reservoir 510 and the keys 302 to be responsively retracted into the coupler body 429.

The ECU 504 is then programmed to actuate the second valve 512 to retract the driveshaft 114, thereby separating the first coupler 116 from the second coupler 118 and leaving the second coupler 118 supported by the coupler support 454.

In the arrangement described above, the ECU 504 performs these successive drive shaft engagement steps automatically. Alternatively, the ECU 504 can be programmed to respond to the operator input device 502 to perform each of the above steps sequentially as each step is sequentially commanded by the operator. Alternatively, the ECU can automatically perform two or more of the sequential steps above in sequence and wait for the operator to command the next sequential step using the operator input device 502.

The description above and the figures herein are not intended to illustrate every possible way of constructing a device in accordance with the invention. The description and the figures merely illustrate the principles behind the invention and at least one way of constructing at least one device in accordance with the invention. The invention is defined by the claims below.

We claim:

1. An agricultural harvester (100) comprising:
    a self-propelled vehicle (102);
    a feederhouse (104) disposed on the front of the self-propelled vehicle (102);
    a driveshaft (114), the driveshaft (114) having a proximal end supported for rotation on the feederhouse (104) about an axis of rotation, the driveshaft (114) having a distal end that is extendable from the proximal end;
    a first coupler (116) fixed to the distal end, said first coupler (116) being configured for engagement with
    a second coupler (118), said second coupler (118) being disposed on an agricultural harvesting head (106) to drive a reciprocating knife of the agricultural harvesting head (106); and
    a piston (210) fixed to the driveshaft (114) to extend the distal end with respect to the proximal end,
    wherein a longitudinal bore (228) is formed in the driveshaft (114) and further wherein a hydraulic passageway (230, 236) extends between an outer surface of the driveshaft (114) to conduct hydraulic fluid from an outer surface of the driveshaft (114) into the longitudinal bore (228).

2. The agricultural harvester (100) of claim 1, wherein the driveshaft (114) comprises a first sliding shaft (202), and a second sliding shaft (204) slidingly supported on the first sliding shaft (202).

3. The agricultural harvester (100) of claim 2, wherein first splines (206) are disposed on the first sliding shaft (202), and second splines (208) are disposed on the second sliding shaft (204), and further wherein the first sliding shaft (202) is received into the second sliding shaft (204) such that the first splines (206) slidingly engage the second splines (208).

4. The agricultural harvester (100) of claim 3, wherein a piston rod (212) supporting the piston (210) is fixed to the second sliding shaft (204), and wherein the piston rod (212) and the piston (210) are slidingly received in a longitudinal bore (228) formed in the first sliding shaft (202).

5. The agricultural harvester (100) of claim 1, wherein the piston (210) is disposed in the longitudinal bore (228) to contact and be actuated by hydraulic fluid passing through the hydraulic passageway (230, 236) and into the longitudinal bore (228).

6. The agricultural harvester (100) of claim 5, wherein the piston (210) is fixed to a piston rod (212) disposed within the longitudinal bore (228), and further wherein the piston rod (212) is fixed to the distal end of the driveshaft (114).

7. The agricultural harvester (100) of claim 1, wherein a first hydraulic fluid connector (200, 400) is supported on the outer surface of the driveshaft (114) for free rotation about the driveshaft (114).

8. The agricultural harvester (100) of claim 7, wherein the first hydraulic fluid connector (200) and the outer surface of the driveshaft (114) define an annular gap (229, 237).

9. The agricultural harvester (100) of claim 8, wherein the first hydraulic fluid connector (200) has a plurality of shaft seals (222, 224, 226) that extend about and seal against the driveshaft (114) to ensure that hydraulic fluid forced into the first hydraulic fluid connector (200) is communicated into the annular gap (229, 237) and thence through the hydraulic passageway (230, 236).

* * * * *